United States Patent
Maruyama et al.

(10) Patent No.: US 9,311,730 B2
(45) Date of Patent: Apr. 12, 2016

(54) AGGREGATING GRAPH STRUCTURES

(71) Applicant: INTERNATIONAL BUSINESS MACHINES CORPORATION, Armonk, NY (US)

(72) Inventors: Daisuke Maruyama, Yamato (JP); Kinichi Mitsui, Hachioji (JP); Takeshi Watanabe, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 211 days.

(21) Appl. No.: 14/221,765

(22) Filed: Mar. 21, 2014

(65) Prior Publication Data

US 2014/0292765 A1    Oct. 2, 2014

(30) Foreign Application Priority Data

Mar. 29, 2013    (JP) ................................. 2013-072073

(51) Int. Cl.
  *G06T 11/20*    (2006.01)
(52) U.S. Cl.
  CPC .................................. *G06T 11/206* (2013.01)
(58) Field of Classification Search
  None
  See application file for complete search history.

(56) References Cited

U.S. PATENT DOCUMENTS

| | | | | |
|---|---|---|---|---|
| 5,159,669 A | * | 10/1992 | Trigg | G06F 17/30014 345/418 |
| 5,544,067 A | * | 8/1996 | Rostoker | G01R 31/31704 703/14 |
| 5,592,600 A | | 1/1997 | De Pauw et al. | |
| 5,623,418 A | * | 4/1997 | Rostoker | G01R 31/31704 703/13 |
| 5,999,192 A | * | 12/1999 | Selfridge | G06F 17/30572 345/440 |
| 6,282,175 B1 | | 8/2001 | Steele et al. | |
| 2006/0041579 A1 | | 2/2006 | Miyashita et al. | |
| 2008/0109443 A1 | | 5/2008 | Tokui et al. | |
| 2009/0012758 A1 | | 1/2009 | Sawada | |
| 2009/0313331 A1 | * | 12/2009 | Rasmussen | G06F 17/2288 709/205 |
| 2010/0153870 A1 | * | 6/2010 | Hoffmann | G06Q 10/06 715/767 |
| 2010/0198778 A1 | * | 8/2010 | Venugopal | G06F 17/3089 707/602 |
| 2010/0223619 A1 | * | 9/2010 | Jaquet | G06F 9/5016 718/104 |
| 2012/0221979 A1 | * | 8/2012 | Farn | G06F 3/0484 715/854 |

(Continued)

FOREIGN PATENT DOCUMENTS

| | | |
|---|---|---|
| JP | H06131470 A | 5/1994 |
| JP | H07129375 A | 5/1995 |
| JP | H08115231 A | 5/1996 |
| JP | H1040358 A | 2/1998 |
| JP | 2000003347 A | 1/2000 |
| JP | 2000121382 A | 4/2000 |
| JP | 2004348341 A | 12/2004 |

(Continued)

*Primary Examiner* — David H Chu
(74) *Attorney, Agent, or Firm* — Law Office of Jim Boice

(57) ABSTRACT

The present invention provides a display apparatus adapted to display a plurality of graph structures each of which is made up of a plurality of elements, by aggregating the plurality of graph structures into a single graph structure as well as provides a display method of the display apparatus and a program used for the display apparatus, the display apparatus including: an acquisition hardware unit adapted to acquire a plurality of graph structures; a distinguishing hardware unit adapted to distinguish the plurality of elements between unchanged elements which have not changed in the plurality of graph structures and changed elements which have changed with transition between/among the plurality of graph structures; an aggregating hardware unit adapted to aggregate the plurality of graph structures; and a display hardware unit adapted to display the aggregated graph structure such that the unchanged elements and the changed elements will be identifiable.

15 Claims, 13 Drawing Sheets

(56) References Cited

U.S. PATENT DOCUMENTS

2012/0260135 A1* 10/2012 Beck ............... G06F 11/323
714/45
2012/0271860 A1* 10/2012 Graham, Jr. ........ G06Q 30/02
707/798

FOREIGN PATENT DOCUMENTS

| | | |
|---|---|---|
| JP | 2006024179 A | 1/2006 |
| JP | 2006065364 A | 3/2006 |
| JP | 2008152739 A | 7/2008 |
| JP | 2009015676 A | 1/2009 |

* cited by examiner (a)　　　　　　　　　　(b)

AGGREGATING GRAPH STRUCTURES

This application is based on and claims the benefit of priority from Japan (JP) Patent Application 2013-072073, filed on Mar. 29, 2013, and herein incorporated by reference in its entirety.

BACKGROUND

The present invention relates to a display apparatus, a display method, and a program for aggregating graph structures.

Known methods of displaying two or more graph structures at the same time include a method for highlighting differences in two graph structures generated based on different data. However, the prior art does not display plural graph structures by aggregating them into a single graph structure so as to clearly show whether or not there are changes in plural nodes and the like and how the changes stand.

SUMMARY

In one embodiment of the present invention, a display apparatus is adapted to display a plurality of graph structures by aggregating the plurality of graph structures into a single graph structure, wherein each of the graph structures is made up of a plurality of elements, and wherein the display apparatus comprises: an acquisition hardware unit adapted to acquire a plurality of graph structures; a distinguishing hardware unit adapted to distinguish the plurality of elements between unchanged elements that have not changed in the plurality of graph structures and changed elements that have changed with transition between/among the plurality of graph structures; an aggregating hardware unit adapted to aggregate the plurality of graph structures; and a display hardware unit adapted to display the aggregated graph structure such that the unchanged elements and the changed elements will be identifiable.

In one embodiment of the present invention, a display method for a display apparatus is adapted to display a plurality of graph structures each of which is made up of a plurality of elements, by aggregating the plurality of graph structures into a single graph structure, wherein the display method causes the display apparatus to go through: an acquisition stage of acquiring a plurality of graph structures; a distinguishing stage of distinguishing the plurality of elements between unchanged elements that have not changed in the plurality of graph structures and changed elements that have changed with transition between/among the plurality of graph structures; an aggregating stage of aggregating the plurality of graph structures; and a display stage of displaying the aggregated graph structure such that the unchanged elements and the changed elements will be identifiable.

In one embodiment of the present invention, a computer program product makes a computer function as a display apparatus adapted to display a plurality of graph structures, each of which is made up of a plurality of elements, by aggregating the plurality of graph structures into a single graph structure, wherein the program product comprises a computer readable storage medium having program code embodied therewith, the program code readable and executable by a processor to perform a method comprising: acquiring a plurality of graph structures; distinguishing the plurality of elements between unchanged elements that have not changed in the plurality of graph structures and changed elements that have changed with transition between/among the plurality of graph structures; aggregating the plurality of graph structures; and displaying the aggregated graph structure such that the unchanged elements and the changed elements will be identifiable.

Note that the summary of the invention described above does not necessarily enumerate all the features of the present invention. Also, subcombinations created from the feature group can also constitute inventions.

DETAILED DESCRIPTION

The present invention will be described below with reference to an embodiment of the present invention, but the following embodiment is not intended to limit the scope of the invention as claimed. Also, a combination of all the features described in the embodiment is not necessarily essential for the solution of the present invention.

Figure 1:
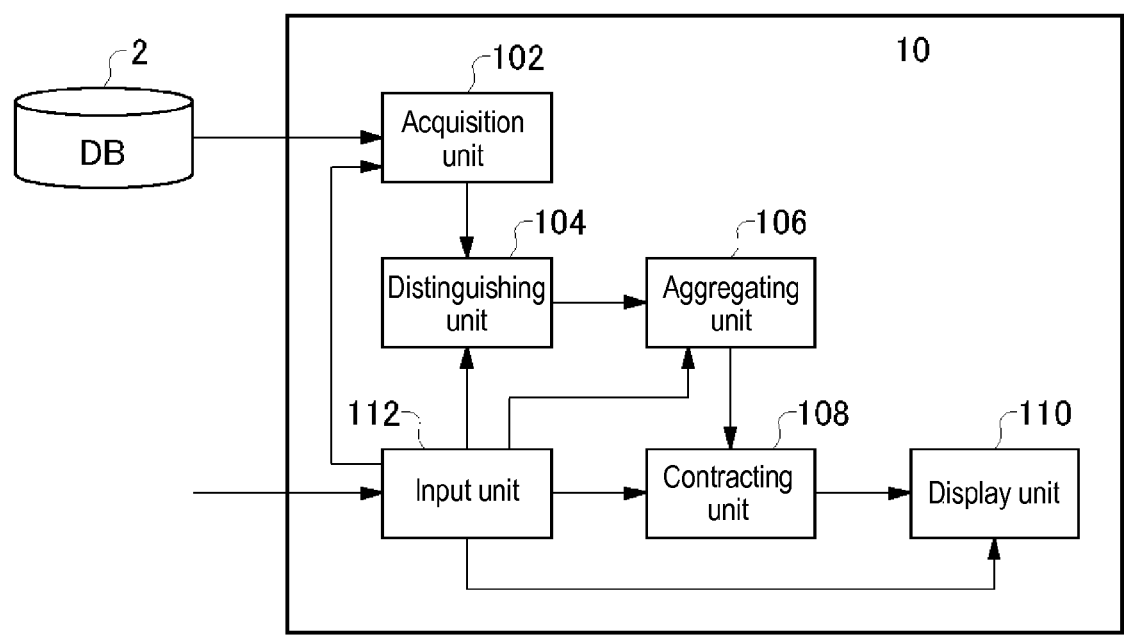
FIG. 1 shows a configuration of a system 1 according to an embodiment of the present invention.

FIG. 1 shows a configuration of a system 1 according to an embodiment of the present invention. The system 1 manages plural graph structures and displays the plural graph structures in an aggregated form. The system 1 includes a database 2 and a display apparatus 10.

The database 2 is a storage device, adapted to store, for example, plural graph structures which change along a series. As the plural graph structures along a series, the database 2 stores a set of plural graph structures corresponding to plural time points, locations, or the like arranged in series (e.g., plural graph structures corresponding to individual time points in a time series).

The database 2 stores graph structures each made up of plural elements. The database 2 may store a graph structure which includes nodes and edges as plural elements. The database 2 supplies the stored graph structures to the display apparatus 10.

As the plural graph structures, the database 2 may store, for example, structures of the same product (e.g., an automobile or household electrical appliance) whose version changes every product release. Also, as the plural graph structures, the database 2 may store, for example, structures (e.g., program call graphs) of the same program under development, where the version or revision of the program changes on every milestone during the development. Note that the database 2 may be a storage device provided in the display apparatus 10.

The display apparatus 10 displays plural graph structures acquired from the database 2 by aggregating them into a single graph structure. The display apparatus 10 includes an acquisition unit 102, a distinguishing unit 104, an aggregating unit 106, a contracting unit 108, a display unit 110, and an input unit 112.

The acquisition unit 102 acquires plural graph structures from the database 2. For example, the acquisition unit 102 acquires plural graph structures at plural time points in time series. The acquisition unit 102 supplies the acquired plural graph structures to the distinguishing unit 104.

Out of plural elements contained in the plural graph structures supplied from the acquisition unit 102, the distinguishing unit 104 distinguishes between unchanged elements which have not changed in the plural graph structures and changed elements which have changed with transition between/among the plural graph structures. The distinguishing unit 104 supplies the plural graph structures to the aggregating unit 106 by including information about the changed elements and unchanged elements in the plural graph structures.

The aggregating unit 106 aggregates the plural graph structures supplied from the distinguishing unit 104. For example, the aggregating unit 106 generates a single aggregated graph structure (also referred to herein as an "aggregate graph structure") from the plural graph structures by aggregating same nodes or corresponding nodes in the plural graph structures into a single node and aggregating same edges or corresponding edges in the plural graph structures into a single edge.

Here, the aggregating unit 106 generates the aggregate graph structure in such a way that changed elements and unchanged elements will be identifiable. The aggregating unit 106 supplies the plural graph structures and the aggregate graph structure to the contracting unit 108.

In the aggregate graph structure supplied from the aggregating unit 106, the contracting unit 108 contracts two or more elements into a contracted element. The contracting unit 108 supplies the plural graph structures, the aggregate graph structure, and information about the contracted element to the display unit 110.

Being connected to a display device such as a display, the display unit 110 displays on the display device the aggregate graph structure, which has been supplied from the contracting unit 108, in such a way that changed elements and unchanged elements will be identifiable. For example, in the aggregate graph structure, the display unit 110 may display an indicator which visually indicates a changed element and an indicator which indicates an unchanged element, differently from each other.

In the aggregate graph structure, the display unit 110 displays the contracted element resulting from contraction of two or more elements. Also, when a command to expand the contracted element is entered by a user via the input unit 112, the display unit 110 may display the two or more pre-contraction elements instead of the contracted element, in the aggregate graph structure.

Also, together with the aggregate graph structure, the display unit 110 displays an interface showing a time series which represents plural time points. When one or more time points in the time series are selected by the user via the input unit 112, the display unit 110 displays a graph structure (graph structures) corresponding to the selected time point(s).

The input unit 112, which is connected with input devices such as a mouse, keyboard, and touch panel, accepts various inputs from the user. For example, the input unit 112 allows the user to select plural graph structures to be aggregated and informs the acquisition unit 102. For example, the input unit 112 allows the user to select any of the elements contained in the aggregate graph structure and informs the acquisition unit 102. Also, for example, the input unit 112 allows the user to enter an area of change to pay attention to in distinguishing between changed elements and unchanged elements and supplies the area of change to the distinguishing unit 104.

For example, the input unit 112 allows the user to select one or more time points in the time series and informs the aggregating unit 106 and display unit 110 about details of the input. Also, for example, the input unit 112 receives a user command to expand the contracted element and informs the display unit 110 about details of the input.

In this way, with the display apparatus 10 according to the present embodiment, the distinguishing unit 104 distinguishes between changed elements and unchanged elements in the plural graph structures acquired by the acquisition unit 102, the aggregating unit 106 aggregates the plural graph structures into an aggregate graph structure, and the display unit 110 displays the aggregate graph structure in such a way that the changed elements and the like will be identifiable. Consequently, the display apparatus 10 can show the presence or absence of changes in the nodes, edges, and the like in the plural graph structures in the series as well as details of the changes to the user on the aggregate graph structure.

Figure 2:
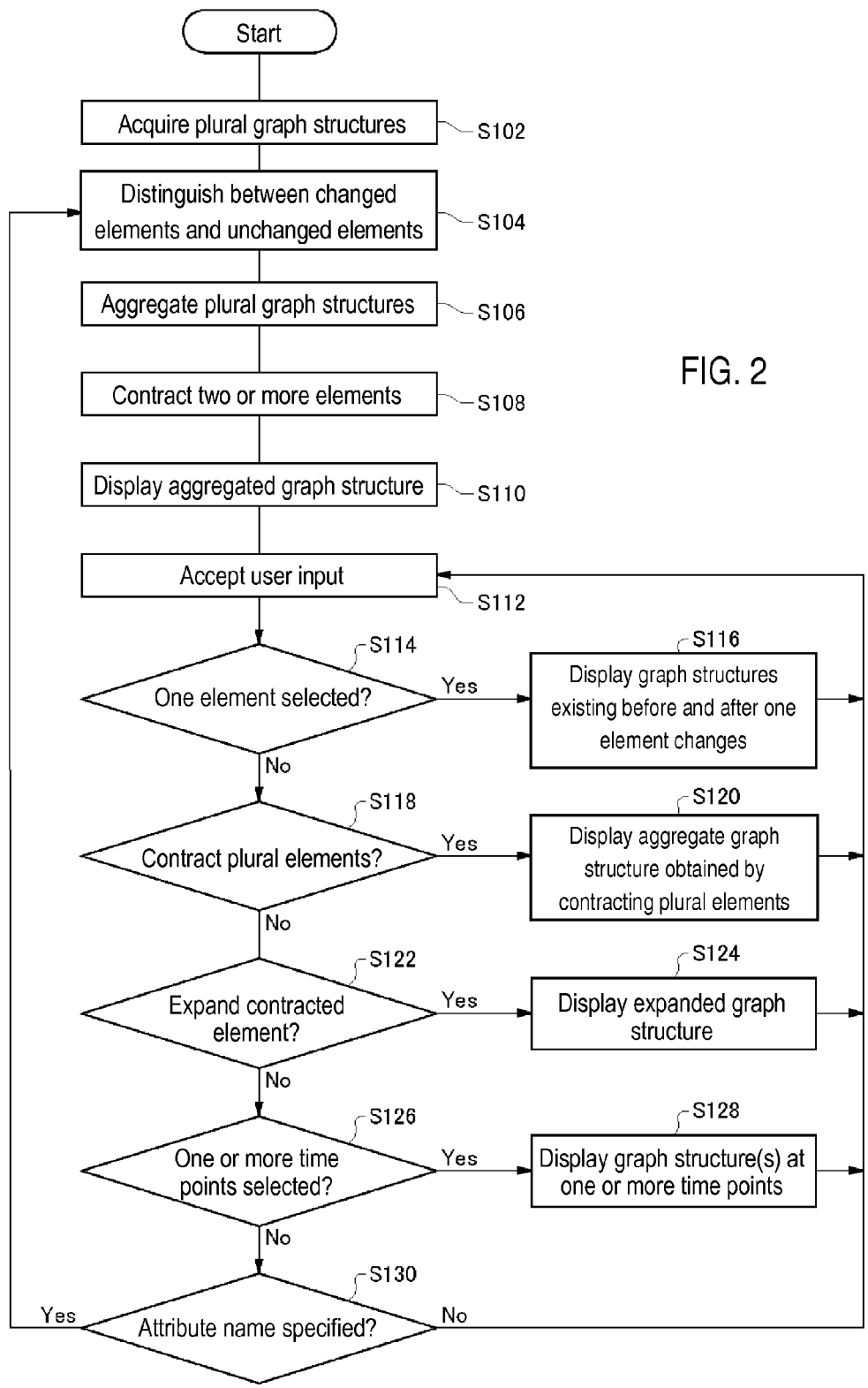
FIG. 2 shows a processing flow of a display apparatus 10 according to the present embodiment.

FIG. 2 shows a processing flow of a display method for the display apparatus 10 according to the present embodiment. In the present embodiment, the display apparatus 10 performs processes of S102 to S130.

First, in S102, the acquisition unit 102 acquires plural graph structures changing from one graph structure in a time series. The acquisition unit 102 may acquire plural predetermined graph structures, or alternatively acquire a graph structure specified by the user via the input unit 112. Also, as the plural graph structures, the acquisition unit 102 may acquire directed graphs on which directions of edges are distinguished or undirected graphs on which directions of edges are not distinguished.

The acquisition unit 102 acquires a graph ID which uniquely identifies a graph structure among plural graph structures in the time series as well as a time stamp which indicates a time point in the time series of the graph structure.

Also, for example, the acquisition unit 102 acquires information about plural elements contained in each of the plural graph structures. As an example, the acquisition unit 102 acquires information about the plural elements, including a node ID which identifies each node, an attribute set of the node, a graph ID of the graph structure to which the node belongs, a time stamp of the graph structure to which the node belongs, and display context containing at least one of (A) node coordinates in the graph structure to which the node belongs and (B) information about a path from a root node in a hierarchical structure of the graph structure.

Also, as information about the plural elements, the acquisition unit 102 acquires an edge ID which identifies each edge, an attribute set of the edge, a set of the node IDs of the nodes at both ends of the edge, a graph ID of the graph structure to which the edge belongs, and a time stamp of the graph structure to which the edge belongs. As the edge ID, the acquisition unit 102 may acquire the set of the node IDs of the nodes at both ends of the edge. When acquiring a directed graph, the acquisition unit 102 may acquire the direction of the edge based on a listed order the node IDs of the nodes at both ends of the edge.

As an attribute set of nodes and edges, the acquisition unit 102 acquires a set of one or more attribute names and attribute values corresponding to the attribute names. The acquisition unit 102 supplies the acquired IDs and the like of the plural graph structures and IDs and the like of the elements in the plural graph structures to the distinguishing unit 104.

Next, in S104, the distinguishing unit 104 distinguishes the plural elements contained in the plural graph structures acquired from the acquisition unit 102 between unchanged elements which have not changed in the plural graph structures and changed elements which have changed with transition between/among the plural graph structures.

For example, the distinguishing unit 104 groups one or more nodes contained in the plural graph structures and provided with the same node ID. Then, among the grouped one or more nodes having the same ID, the distinguishing unit 104 distinguishes a node generated, deleted, or subjected to change in the attribute value corresponding to at least one attribute name during a transition from a graph structure to a graph structure at a next time point in the time series as a changed element (i.e., "changed node"), and distinguishes other nodes as unchanged elements (i.e., "unchanged nodes").

Furthermore, the distinguishing unit 104 groups one or more edges contained in the plural graph structures and provided with the same edge ID. Then, among the grouped one or more edges having the same ID, the distinguishing unit 104 distinguishes an edge generated, deleted, subjected to change in the nodes at both ends, or subjected to change in the attribute value corresponding to at least one attribute name during a transition from a graph structure to a graph structure at a next time point in the time series as a changed element (i.e., "changed edge"), and distinguishes other edges as unchanged elements (i.e., "unchanged edges").

Here, if an attribute name has been specified via the input unit 112, the distinguishing unit 104 may distinguish a node/edge whose attribute value corresponding to the attribute name specified via the input unit 112 has been changed, as a changed node/changed edge.

Also, the distinguishing unit 104 calculates the number of elements changed with transition between graph structures corresponding to two adjacent time points in the time series. For example, the distinguishing unit 104 calculates the number of nodes generated, deleted, or subjected to change in the attribute value and the number of edges generated, deleted, subjected to change in the nodes at both ends, or subjected to change in the attribute value between graph structures corresponding to two adjacent time points in the time series.

The distinguishing unit 104 supplies the plural graph structures to the aggregating unit 106 by adding information as to whether the element is a changed element or unchanged element to each element of the plural graph structures. Also, the distinguishing unit 104 informs the aggregating unit 106 about the number of elements changed with transition between the graph structures corresponding to two adjacent time points, by associating the number of elements with the two time points.

Next, in S106, the aggregating unit 106 aggregates the plural graph structures supplied from the distinguishing unit 104. For example, the aggregating unit 106 aggregates one or more nodes existing in the plural graph structures and having the same node ID into a single node, aggregates one or more edges existing in the plural graph structures and having the same edge ID into a single edge, and includes change information in information about the nodes and edges.

As an example, regarding the element determined as being a changed element by the distinguishing unit 104, first the aggregating unit 106 generates information on details of change and the time of the change for each element ID, based on the plural graph structures. Next, the aggregating unit 106 generates an aggregate graph structure in which each node has a node ID, an attribute set, information on the distinction between a changed element and unchanged element, change information including details of change and the time of the change, display context, display coordinates, and the like while each edge has an edge ID, an attribute set, change information, the node IDs of the nodes at both ends, and the like.

Consequently, the aggregating unit 106 generates an aggregate graph structure which contains all the nodes and all the edges of the plural graph structures on an ID by ID basis and in which changed elements and unchanged element are identifiable.

The aggregating unit 106 may determine the coordinates of each node in the aggregate graph structure based on a predetermined rule. For example, the aggregating unit 106 may calculate the coordinates of each node in the aggregate graph structure such that a layout will be as close as possible to layouts in the plural graph structures before the graph structures are aggregated. As an example, the aggregating unit 106 may use average coordinates calculated from each node's coordinates in the plural graph structures as the coordinates of the node in the aggregate graph structure. Also, as another example, if some of the plural graph structures contain a tree structure having edges of a particular type, the aggregating unit 106 may calculate the coordinates of each node such that the tree structure having the edges will be retained as it is in at least part of the aggregate graph structure.

Also, for example, the aggregating unit 106 may calculate the coordinates of each node using a model which assumes that a physical force such as a pulling force and repulsive force of a spring, gravitational force, or electromagnetic force exists between/among two or more nodes and that each node moves to a stable position due to the inter-node physical force.

As an example, the aggregating unit 106 may calculate coordinates with the nodes laid out such that a whole system will be physically stable (e.g., the sum total of the forces applied to all the nodes will be equal to or less than a predetermined value) by assuming that each node is a point having a predetermined mass and that each edge is a spring having a predetermined length.

Furthermore, the aggregating unit 106 may assume that electromagnetic repulsion acts between/among nodes. Consequently, the aggregating unit 106 can prevent plural nodes not connected by an edge from approaching and overlapping each other in the aggregate graph structure. The aggregating unit 106 supplies the plural graph structures and information about the aggregate graph structure to the contracting unit 108.

Next, in S108, the contracting unit 108 contracts two or more elements in the aggregate graph structure supplied from aggregating unit 106 into a contracted element. For example, by grouping two or more elements in the aggregate graph structure according to a predetermined rule, the contracting unit 108 generates a contracted element which represents a group of the two or more elements.

For example, the contracting unit 108 may contract two or more unchanged elements in the aggregate graph structure into an unchanged contracted element, and contract two or more changed elements into a changed contracted element. As an example, the contracting unit 108 may generate an unchanged contracted node by contracting two or more unchanged nodes in the aggregate graph structure, and generate an unchanged contracted edge by contracting two or more unchanged edges.

Also, as an example, the contracting unit 108 may generate an unchanged contracted node by contracting an unchanged node—unchanged edge—unchanged node in the aggregate graph structure, and generate a changed contracted node by contracting a changed node—changed edge—changed node. Consequently, the contracting unit 108 can simplify the aggregate graph structure while preserving a boundary between a changing portion and non-changing portion of the aggregate graph structure.

Also, for example, the contracting unit 108 may contract one or more changed elements and one or more unchanged elements in the aggregate graph structure into a changed contracted element. As an example, the contracting unit 108 may contract one or more changed nodes, one or more unchanged node, and the like in the aggregate graph structure into a changed contracted node, and contract one or more changed edges, one or more unchanged edges, and the like into a changed contracted edge. Consequently, the contracting unit 108 can simplify the aggregate graph structure while indicating that the contracted element contains changed elements.

Also, the contracting unit 108 may recalculate positions of the nodes in the entire aggregate graph structure, or alternatively recalculate positions of only the contracted nodes by fixing positions of the non-contracted nodes. The contracting unit 108 may calculate the positions of the nodes after the contraction using a physical model similar to the one used by the aggregating unit 106 to calculate the coordinates of each node in S106. By using a physical model, the contracting unit 108 can bring the layout of the aggregate graph structure after the contraction close the pre-contraction layout.

As information about the contracted element, the contracting unit 108 generates information about the nodes and edges contained in the contracted element, distinction between a contracted element and non-contracted element, display context, coordinates, and the like.

The contracting unit 108 may repeat contraction of plural elements until a predetermined condition is satisfied. For example, the contracting unit 108 may contract the plural elements until the number of elements contained in the aggregate graph structure is equal to or less than a certain value. Also, the contracting unit 108 may target all the elements of the aggregate graph structure for contraction, or alternatively target some of the elements of the aggregate graph structure for contraction.

The contracting unit 108 supplies the plural graph structures, the aggregate graph structure, and information about the contracted element to the display unit 110. Furthermore, the contracting unit 108 informs the display unit 110 about the number of elements changed with transition between graph structures corresponding to two adjacent time points.

Next, in S110, the display unit 110 displays the aggregate graph structure supplied from the contracting unit 108, in such a way that the changed elements and unchanged elements will be identifiable. When the aggregate graph structure contains contracted elements, the display unit 110 displays the aggregate graph structure in such a way that changed contracted elements and unchanged contracted elements will be identifiable.

For example, when displaying an aggregate graph structure, the display unit 110 displays a changed contracted element in place of two or more changed elements, and an unchanged contracted element in place of two or more unchanged elements based on information about a changed contracted element and unchanged contracted element.

Together with the aggregate graph structure, the display unit 110 displays an interface, allowing the user to select one of plural graph structures. For example, the display unit 110 displays a time series which represents plural time points corresponding to the plural graph structures. As an example, the display unit 110 may display a time series bar, which is a straight line showing plural time points in a time series by sequentially arranging the time points corresponding to the times indicated by the time stamps contained in the plural graph structures.

The display unit 110 may display the number of changing elements between two adjacent time points on the time series bar. Consequently, the display unit 110 can indicate a time point at which a large number of changes take place in the plural graph structures changing in time series.

Also, the display unit 110 displays a check box or the like, allowing the user to select all or part of attribute names contained in the elements of the aggregate graph structure. Consequently, via the input unit 112, the display unit 110 can allow the user to enter attributes to pay attention to in distinguishing between changed elements and unchanged elements.

Next, in S112, the input unit 112 accepts user input. For example, the input unit 112 accepts user input for the aggregate graph structure and time series bar or the like displayed by the display unit 110.

Next, in S114, the input unit 112 determines whether or not the user has selected one of the elements contained in the aggregate graph structure displayed by the display unit 110 or in the graph structure corresponding to one time point. If the user has selected one element, the input unit 112 passes processing to S116. Otherwise, the input unit 112 passes processing to S118.

In S116, the display unit 110 displays the graph structures existing at the time points before and after the one selected element changes. For example, the display unit 110 extracts information about the time points before and after the change in the selected element, from the change information about the element in the aggregate graph structure, and displays the graph structures existing at the time points before and after the change.

Next, the display apparatus 10 returns processing to S112. Alternatively, the display apparatus 10 may display the original aggregate graph structure in place of the graph structures existing at the time points before and after the change if the input unit 112 receives a user command to finish displaying the graph structures existing at the time points before and after the change, and then may return processing to S112.

In S118, the input unit 112 determines whether or not the user has entered a command to contract two or more of the elements contained in the aggregate graph structure displayed by the display unit 110 or in the graph structure corresponding to one time point. If the user has entered a command to contract two or more elements, the input unit 112 passes processing to S120. Otherwise, the input unit 112 passes processing to S122.

In S120, the display unit 110 displays an aggregate graph structure obtained by contracting the selected plural elements. For example, the contracting unit 108 generates the aggregate graph structure by contracting the selected plural elements as in the case of S108 and the display unit 110 displays the aggregate graph structure generated by the contracting unit 108. Next, the display apparatus 10 returns processing to S112.

In S122, the input unit 112 determines whether or not the user has entered a command to expand a contracted element in the aggregate graph structure. If the user has entered a command to expand a contracted element, the input unit 112 passes processing to S124. Otherwise, the input unit 112 passes processing to S126. If no contracted element is contained in the graph structure displayed by the display unit 110, the display apparatus 10 may omit the process of S122 and pass processing to S126.

In S124, instead of the contracted element, the display unit 110 displays the two or more pre-contraction elements in the aggregate graph structure. For example, the display unit 110 acquires information about the two or more pre-contraction elements based on information contained in the contracted element and displays the information about the elements. The display apparatus 10 returns processing to S112.

In S126, the input unit 112 determines whether or not the user has selected one or more time points in the time series displayed by the display unit 110. If the user has selected one or more time points, the input unit 112 passes processing to S128. Otherwise, the input unit 112 passes processing to S130.

In S128, the display unit 110 displays the graph structure(s) corresponding to the selected one or more time points. For example, if the user has selected one time point, the display unit 110 displays the graph structure corresponding to the selected one time point.

In so doing, the display unit 110 may display the nodes in the graph structure corresponding to the one time point at the positions of the corresponding nodes in the aggregate graph structure displayed in S110. Consequently, when displaying the aggregate graph structure and the graph structure corresponding to the one time point by switching therebetween, the display unit 110 can display the graph structure corresponding to the one time point so as to allow easy identification of corresponding nodes and to reduce flicker and the like of the display.

If the user has selected two or more time points, the input unit 112 provides information about the selected two or more time points to the distinguishing unit 104, which then distinguishes between unchanged elements and changed elements in two or more graph structures corresponding to the two or more time points in a manner similar to the process of S104. The distinguishing unit 104 supplies information about the two or more graph structures and the like to the aggregating unit 106.

Of the plural graph structures, the aggregating unit 106 aggregates the two or more graph structures corresponding to the selected two or more time points in a manner similar to the process of S106, and thereby generate a sub-aggregate graph structure. The aggregating unit 106 supplies the selected two or more graph structures as well as information about the generated sub-aggregate graph structure to the contracting unit 108.

The contracting unit 108 contracts two or more elements in the sub-aggregate graph structure into a contracted element in a manner similar to the process of S108. The contracting unit 108 may contract two or more elements according to the same rule as the one used in S108. Consequently, the contracting unit 108 can display the sub-aggregate graph structure on the display unit 110 in such a way as to allow ready comparison with the aggregate graph structure.

The contracting unit 108 supplies information about the sub-aggregate graph structure and contracted element to the display unit 110. Next, the display unit 110 displays the aggregate graph structure supplied from the contracting unit 108. The display apparatus 10 returns processing to S112.

In S130, the input unit 112 determines whether the user has specified an attribute name. For example, the input unit 112 determines whether the user has specified any of the attribute names displayed by the display unit 110 or has unspecified any of the attribute names.

If it is determined that the user has specified an attribute name, the input unit 112 returns processing to S104. Otherwise, the input unit 112 returns processing to S112. In the second and subsequent repetitions of S104, among the plural elements, the distinguishing unit 104 distinguishes between changed elements whose attribute values corresponding to a generated, deleted, or specified attribute name have been changed and unchanged elements whose attribute values corresponding to a non-generated, non-deleted, and specified attribute name remain unchanged.

Consequently, when an attribute name is specified via the input unit 112, the distinguishing unit 104 can distinguish between changed elements and unchanged elements anew, based on the change in the attribute value related to the attribute name specified by the user.

In this way, using the display method according to the present embodiment, the display apparatus 10 can show changes in nodes, edges, and the like in the plural graph structures to the user on an aggregate graph structure. Furthermore, in response to user input, the display apparatus 10 can display how any desired change stands, contract or aggregate a selected element (selected elements), display a graph structure or sub-aggregate graph structure corresponding to any desired time point, or display an aggregate graph structure with attribute name to pay attention to being changed.

Also, although the aggregating unit 106 determines the coordinates of each node in the aggregate graph structure in S106 and the like according to the present embodiment and the contracting unit 108 calculates the position of the node after contraction, in S108 and the like, alternatively the display unit 110 may determine the coordinates of each node in the aggregate graph structure and the position of each node after contraction, in S110 and the like.

Figure 3:
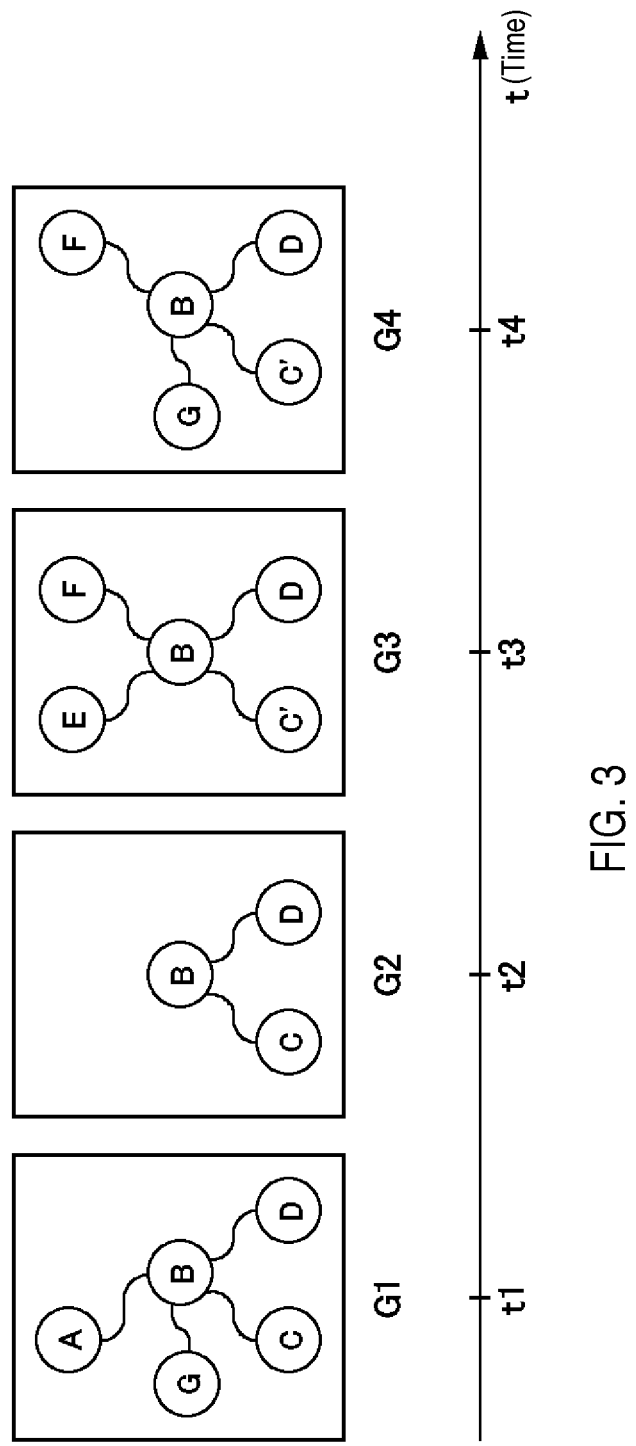
FIG. 3 shows an example of plural graph structures which change in a time series.

FIG. 3 shows an example of plural graph structures which change in a time series. Graph structure G1 is present at time point t1. Graph structure G1 has nodes A, B, C, D, and G, edge A-B interconnecting node A and node B, edge B-C interconnecting node B and node C, edge B-D interconnecting node B and node D, and edge B-G interconnecting node B and node G.

Graph structure G2 is present at time point t2 subsequent to time point t1. In graph structure G2, node A, node G, edge A-B, and edge B-G have been deleted from graph structure G1.

Graph structure G3 is present at time point t3 subsequent to time point t2. In graph structure G3, node E, node F, edge B-E, and edge B-F have been added to graph structure G2. Also, in graph structure G3, node C in graph structure G2 has been changed into node C' with changes in some attribute values of node C.

Graph structure G4 is present at time point t4 subsequent to time point t3. In graph structure G4, node G and edge B-G have been added again to graph structure G3, and node E and edge B-E have been deleted.

Figure 4:
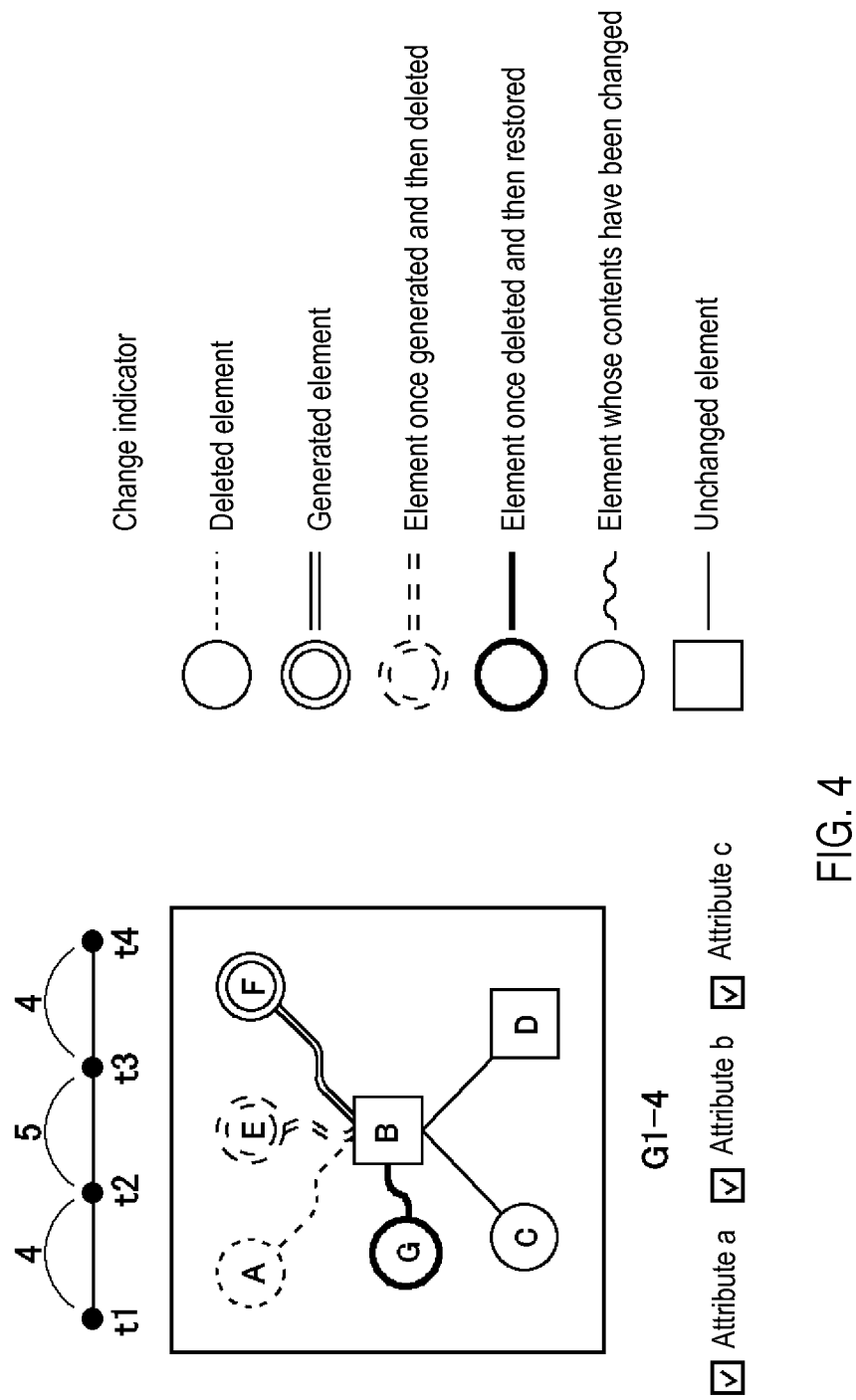
FIG. 4 shows an example of an aggregate graph structure displayed by the display unit 110.

FIG. 4 shows an example of the aggregate graph structure displayed by the display unit 110 in S110 and illustrates an indicator in the aggregate graph structure. Aggregate graph structure G1-4 is generated from graph structure G1, graph structure G2, graph structure G3, and graph structure G4 shown in FIG. 3.

Aggregate graph structure G1-4 contains all node A, node B, node C, node D, node E, node F, and node G as well as all edge B-A, edge B-C, edge B-D, edge B-E, edge B-F, and edge B-G contained in graph structures G1 to G4. The aggregate graph structure of FIG. 4 does not contain a contracted element.

The display unit 110 displays the elements in the aggregate graph structure G1-4 using different indicators depending on the presence or absence of changes in plural graph structures G1 to G4 as well as on details of the changes.

For example, the display unit 110 displays node A and edge A-B deleted in graph structure G2 as a dotted circle and a dotted line, respectively, displays node F and edge B-F generated in graph structure G3 as a double circle and double line, respectively, displays node E and edge B-E generated in graph structure G3, but deleted in graph structure G4 as a double dotted circle and double dotted line, respectively.

The display unit 110 displays node G and edge B-G deleted in graph structure G2, but restored in graph structure G4 as a thick circle and thick line, respectively. The display unit 110 displays node C whose attribute value has been changed in graph structure G3 as a single-line circle.

Also, the display unit 110 displays node D, edge B-C, and edge B-D not generated, not deleted, or not subjected to change in attribute value in any of plural graph structures G1 to G4 as a single-line square or straight line. In this way, the display unit 110 displays an aggregated graph structure such that the changed elements once deleted at plural time points and then generated again will be identifiable.

The display unit 110 may distinguish changed elements and unchanged elements by color instead of distinguishing the unchanged elements and changed elements by line styles, figures, and the like. Also, the display unit 110 may display the number of times an element has changed with transition between/among plural graph structures, near the element.

The display unit 110 displays the time series bar, as illustrated, above aggregate graph structure G1-4, where plural time points t1 to t4 are placed in order on the time series bar. Furthermore, between each pair of adjacent time points on the time series bar, the display unit 110 displays the number of elements changed with transition between the two time points.

For example, the display unit 110 shows that four elements have been changed with transition from time point t1 to time point t2, that five elements have been changed with transition from time point t2 to time point t3, and that four elements have been changed with transition from time point t3 to time point t4.

As illustrated, under aggregate graph structure G1-4, the display unit 110 displays all or part of attribute names contained in each element of the aggregate graph structure. Also, the display unit 110 displays the attribute name used by the distinguishing unit 104 to distinguish changed elements and the like, in such a way as to be identifiable.

For example, the display unit 110 displays check boxes of attribute a, attribute b, and attribute c contained in node A and the like and displays the check boxes of attribute a, attribute b, and attribute c as being checked when the distinguishing unit 104 distinguishes elements whose attribute a, attribute b, and attribute c have had attribute values changed as changed elements.

Figure 5:
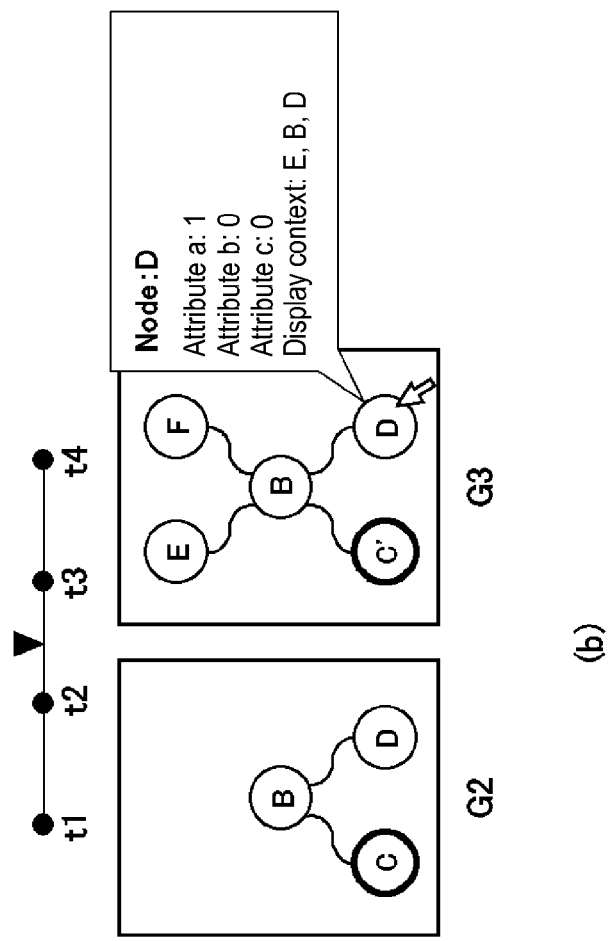
FIG. 5 shows an example of a display presented on the display unit 110 when one element is selected via an input unit 112.
Figure 5:
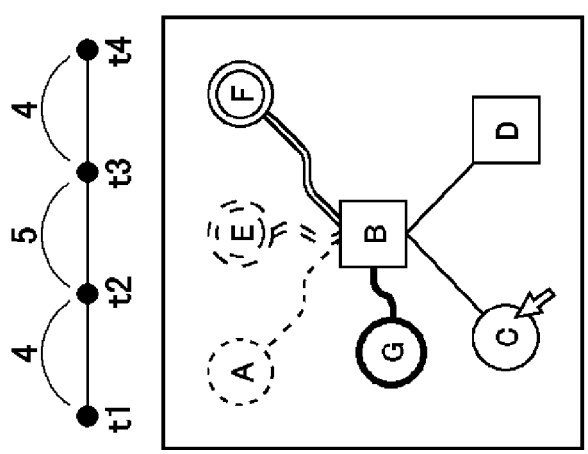

FIG. 5 shows an example of a display presented on the display unit 110 in S116 when one element is selected via an input unit 112. FIG. 5(a) shows aggregate graph structure G1-4 identical with aggregate graph structure G1-4 shown in FIG. 4. The display unit 110 displays the graph structures existing at the time points before and after the one selected element changes.

For example, in aggregate graph structure G1-4 shown in FIG. 5(a), when the user selects node C via the input unit 112 (e.g., clicks a left mouse button or the like by positioning a cursor on node C), the display unit 110 displays graph structures G2 and G3 existing at time points t2 and t3 before and after a change is made to node C as shown in FIG. 5(b). As shown in FIG. 5(b), the display unit 110 may display a downward-pointing triangular indicator indicating time points t2 and t3 before and after a change is made to node C.

In addition to/instead of the above-mentioned display, the display unit 110 may display information about the one selected element. For example, in graph structure G3 shown in FIG. 5(b), when the user selects node D via the input unit 112 (e.g., clicks the right mouse button or the like by positioning the cursor on node D), the display unit 110 may display attribute names of node D and corresponding attribute values.

If the plural graph structures aggregated by the aggregating unit 106 has a tree structure, the display unit 110 may show display context including the path from the root node of the aggregate graph structure/graph structures. For example, the display unit 110 may display a path (E, B, D) from the root node E as display context of node D as shown in FIG. 5(b).

Figure 6:
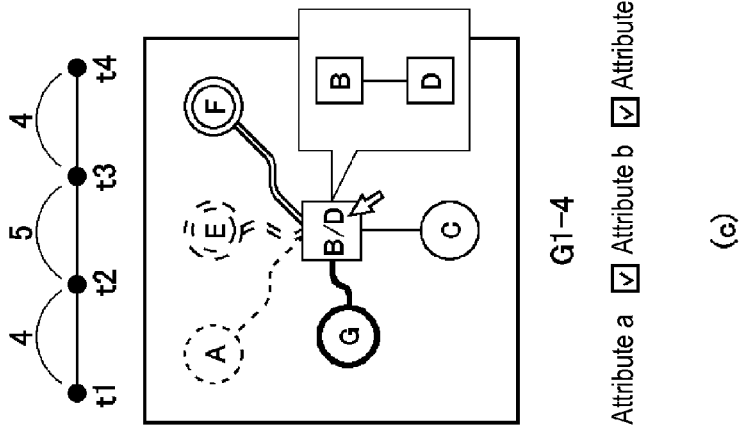
FIG. 6 shows an example of an aggregate graph structure displayed on the display unit 110, containing a contracted element.
Figure 6:
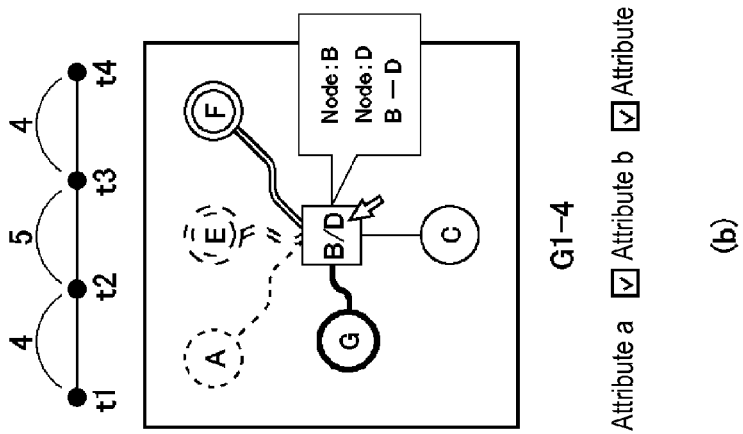
Figure 6:
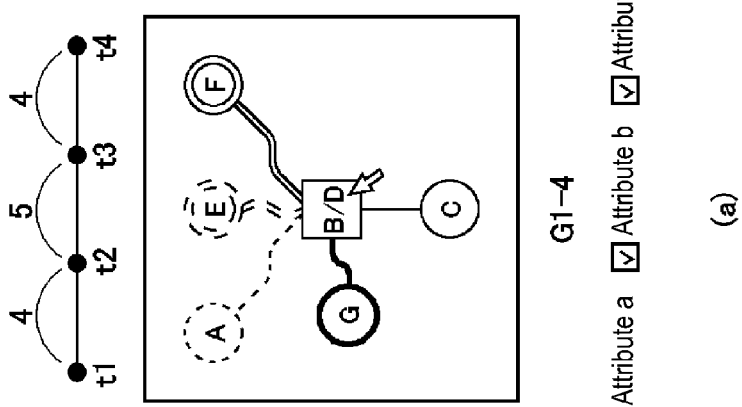

FIG. 6 shows an example of an aggregate graph structure displayed on the display unit 110, containing a contracted element. In S110, instead of the aggregate graph structure shown in FIG. 4, the display unit 110 may display aggregate graph structure G1-4 containing the contracted element shown in FIG. 6(a).

For example, as shown in FIG. 6(a), instead of node B, edge B-D, and node D, the display unit 110 displays contracted node B/D resulting from contracting these elements. Here, since all of node B, edge B-D, and node D are unchanged elements in graph structures G1 to G4, the display unit 110 may display contracted node B/D as a single-line square which represents an unchanged contracted node. Also, the display unit 110 may display a changed contracted element by a single-line circle.

In response to a user input, instead of a contracted element, the display unit 110 displays two or more elements yet to be contracted into the contracted element. For example, in aggregate graph structure G1-4 shown in FIG. 6(a), when the user selects contracted node B/D via the input unit 112 (e.g., clicks the left mouse button or the like by positioning the cursor on contracted node B/D), the display unit 110 displays aggregate graph structure G1-4 shown in FIG. 4 by expanding the selected contracted node B/D.

Here, in aggregate graph structure G1-4 shown in FIG. 4, the display unit 110 may contract and display two or more elements selected by the user. For example, in S118, when the user selects node B and node D via the input unit 112 (e.g., specifies a range with the mouse such that the range will include node B and node D), the display unit 110 displays a menu screen or the like, allowing the user to select contraction of node B and node D.

On the menu screen, if the input unit 112 receives a user command to contracted node B and node D, in S120, the contracting unit 108 may generate aggregate graph structure G1-4 shown in FIG. 6(a) by contraction node B, node D, and edge B-D, and the display unit 110 may display aggregate graph structure G1-4.

Instead of FIG. 6(a), the display unit 110 may display nodes B and D and edge B-D which make up contracted node B/D as shown in FIG. 6(b). Alternatively, the display unit 110 may display a partial graph structure by expanding contracted node B/D as shown in FIG. 6(c).

In this way, as the display unit 110 displays a contracted element instead of plural elements, an aggregate graph structure made up of a large number of elements can be displayed compactly.

Figure 7:
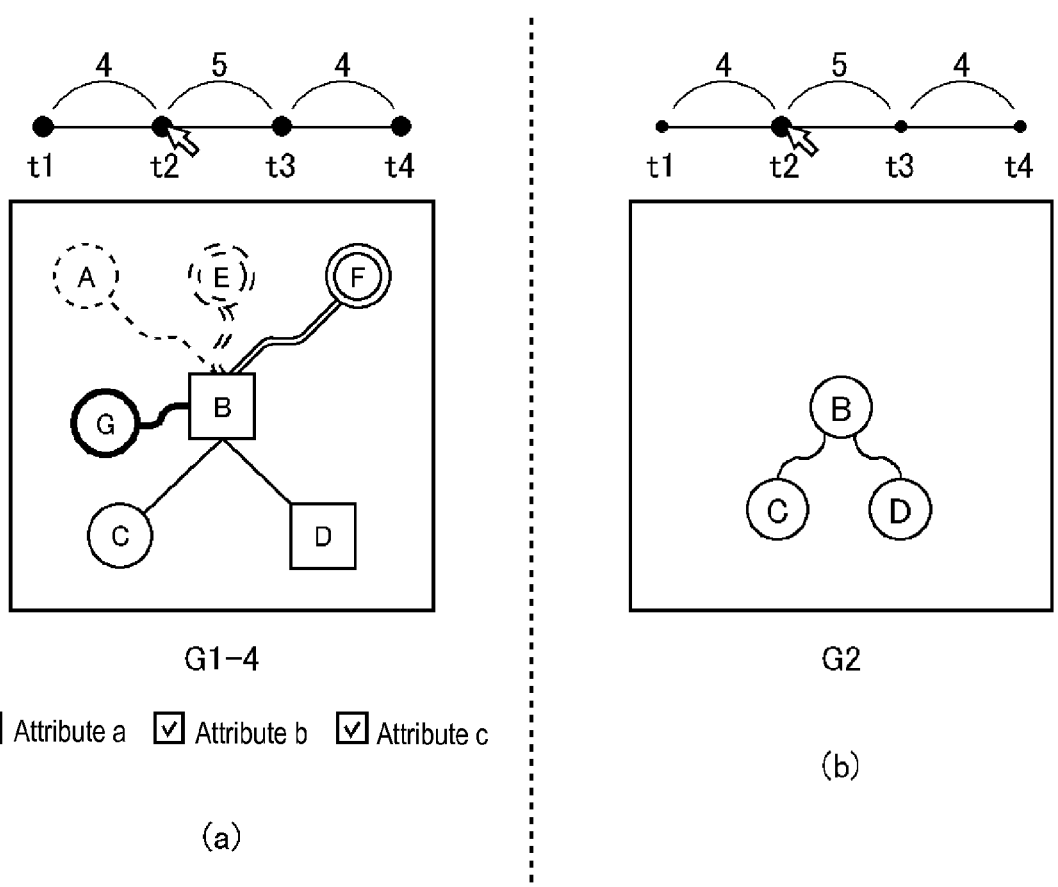
FIG. 7 shows an example of a display presented on the display unit 110 when one time point is selected via the input unit 112.

FIG. 7 shows an example of a display presented on the display unit 110 when one time point is selected via the input unit 112. FIG. 7(a) shows aggregate graph structure G1-4 identical with aggregate graph structure G1-4 shown in FIG. 4. The display unit 110 displays a graph structure existing at one time point selected in S126.

For example, in aggregate graph structure G1-4 shown in FIG. 7(a), when the user selects time point t2 on the time series bar via the input unit 112 (e.g., clicks the left mouse button or the like by positioning the cursor on time point t2), the display unit 110 displays graph structure G2 existing at time point t2 as shown in FIG. 7(b).

The display unit 110 may display a slide bar as the time series bar to allow a time point on the time series bar to be selected. Consequently, the display unit 110 can display changes in the graph structure on the time series bar one after another.

Regarding each element in plural graph structures G1 to G4, the display unit 110 may display the version of the element in the graph structure existing at each time point. For example, the display unit 110 may display node C as "C1" in graph structures G1 and G2 existing at time points t1 and t2 before the attribute value of node C changes, and as "C2" in graph structures G3 and G4 existing at time points t3 and t4 after the change.

Figure 8:
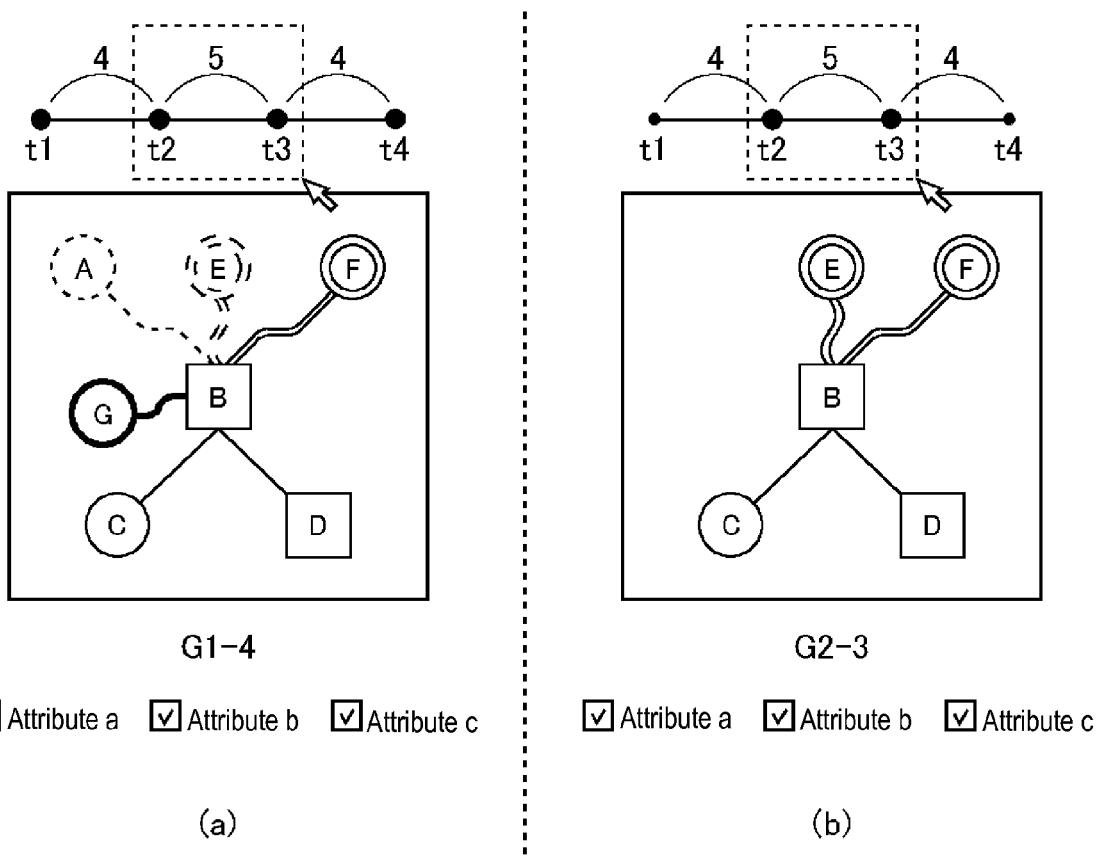
FIG. 8 shows an example of a display presented on the display unit 110 when two or more time points are selected via the input unit 112.

FIG. 8 shows an example of a display presented on the display unit 110 when two or more time points are selected via the input unit 112. FIG. 8(a) shows aggregate graph structure G1-4 identical with aggregate graph structure G1-4 shown in FIG. 4. The display unit 110 displays a sub-aggregate graph structure by aggregating the graph structures existing at two or more time points selected in S126.

For example, in aggregate graph structure G1-4 shown in FIG. 8 (a), when the user selects time points t2 and t3 on the time series bar via the input unit 112 (e.g., specifies a range which includes time points t2 and t3), the display unit 110 displays sub-aggregate graph structure G2-3 by aggregating graph structures G2 and G3 existing at time points t2 and t3 as shown in FIG. 8(b).

In sub-aggregate graph structure G2-3, the display unit 110 does not display any element that is not contained in the selected graph structures G2 and G3. For example, the display unit 110 does not display node A, node G, edge A-B, and edge B-G in sub-aggregate graph structure G2-3.

Also, in sub-aggregate graph structure G2-3, the display unit 110 may display a changed element and unchanged element based solely on changes in two or more selected graph structures G2 and G3. For example, in sub-aggregate graph structure G2-3, even though node E is deleted at time point t4, the display unit 110 may display node E simply as a generated node using a double circle.

Also, the aggregating unit 106 may identify the coordinates of nodes in the sub-aggregate graph structure with the aggregate graph structure or recalculate new coordinates only from the nodes contained in the sub-aggregate graph structure.

Also, when two or more time points are entered, instead of displaying a sub-aggregate graph structure, the display unit 110 may display graph structures G corresponding to the two or more entered time points, side by side as shown in FIG. 5(b).

Figure 9:
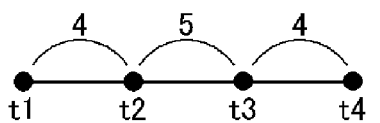
FIG. 9 shows an example of a display presented on the display unit 110 when an attribute name is selected via the input unit 112.
Figure 9:
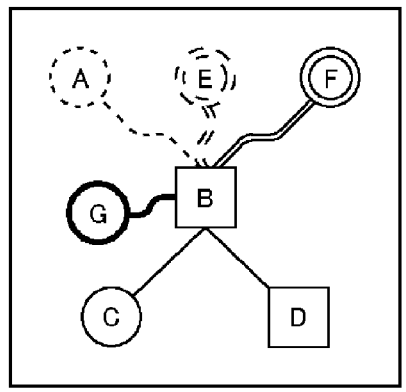
Figure 9:
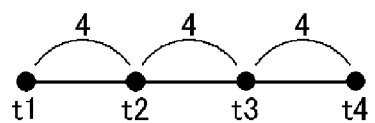
Figure 9:
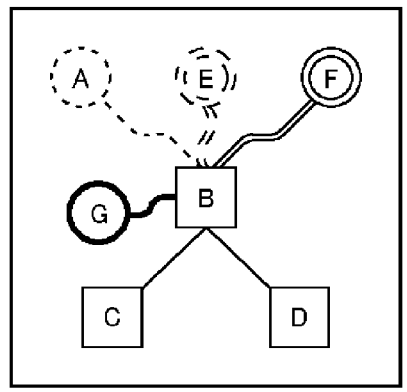

FIG. 9 shows an example of a display presented on the display unit 110 when an attribute name is specified via the input unit 112. FIG. 9(a) shows aggregate graph structure G1-4 identical with aggregate graph structure G1-4 shown in FIG. 4. The display unit 110 displays a changed element and unchanged element in the aggregate graph structure, where the changed element and unchanged element are distinguished based on a change in the attribute value corresponding to the selected attribute name.

For example, at node C in aggregate graph structure G1-4 shown in FIG. 9(a), only the attribute value of attribute a changes during transition from time point t2 to time point t3, and the attribute values of attribute b and attribute c remain unchanged.

When the user unspecifies attribute a out of attributes a to c, i.e., specifies attributes b and c, via the input unit 112 (e.g., clicks the left mouse button or the like by positioning the cursor on the checked check box of attribute a), the display unit 110 displays aggregate graph structure G1-4 containing the changed element and unchanged element distinguished based on the change in the attribute values of attribute b and attribute c as shown in FIG. 9(b).

Since the attribute values of attribute b and attribute c at node C remain unchanged, in the aggregate graph structure of FIG. 9(b), the display unit 110 displays node C as an unchanged node using a single-line square. Also, on the time series bar, the display unit 110 displays the number of elements changed with transition from time point t2 to time point t3, by reducing the number to 4 from 5.

Figure 10:
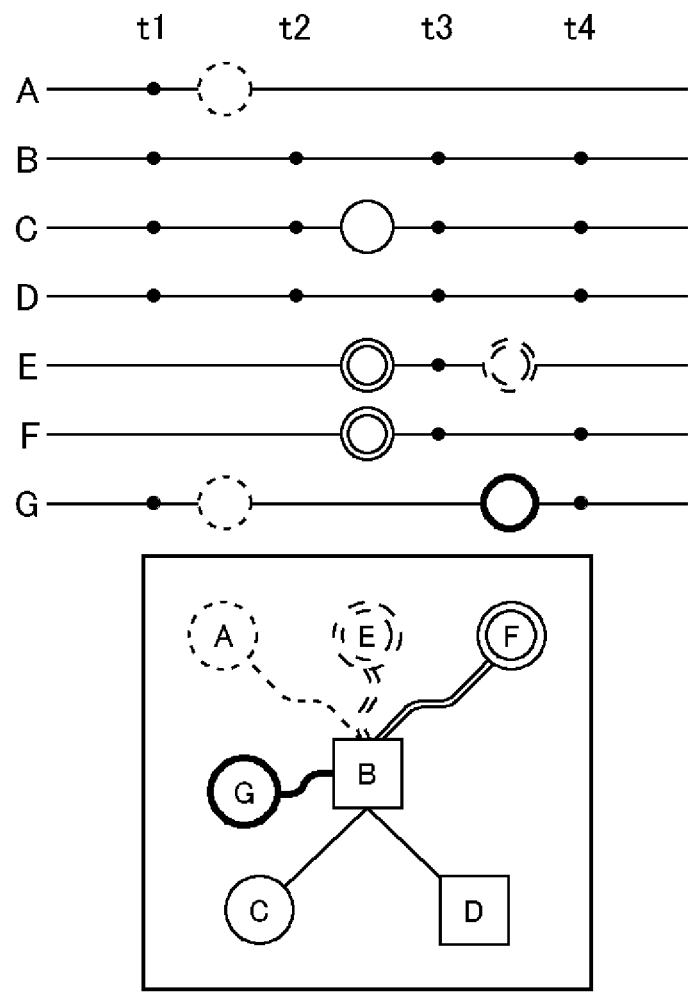
FIG. 10 shows an example of a display presented on the display unit 110 according to a first modification of the present embodiment.

FIG. 10 shows an example of a display presented on the display unit 110 according to a first modification of the present embodiment. FIG. 10 shows aggregate graph structure G1-4 identical with aggregate graph structure G1-4 shown in FIG. 4. In the present modification, instead of the time series bar, the display unit 110 displays a time series matrix in which plural time points and plural elements are arranged in a matrix.

For example, above aggregate graph structure G1-4, the display unit 110 displays a time series matrix whose horizontal axis represents time points t1 to t4 and whose vertical axis represents nodes A to G. On the time series matrix, the display unit 110 displays a horizontal line for each node, the horizontal line corresponding to the time series, and locations of the node are indicated by black dots on the horizontal line. For example, the display unit 110 displays black dots on the horizontal line of node B at the locations corresponding to time points t1 to t4.

On the horizontal line for each node, the display unit 110 displays a node-change position between time points as well as details of the change. For example, the display unit 110 displays a dotted circle between time points t1 and t2 on the horizontal line of node A, indicating that node A has been deleted. The time series matrix allows the display apparatus 10 to display information about changes of each element in more detail.

Also, in the present modification, instead of the time series bar, the display unit 110 may display a time series matrix in which plural time points, plural versions, and the like are arranged in a matrix. For example, when the display apparatus 10 acquires graph structures showing the structure of a product as plural graph structures, the display unit 110 displays a time series matrix in which plural time points and plural product versions are arranged in a matrix, where the time points represent sales seasons of the product and the product versions correspond to sales areas (e.g., Japan, Europe, U.S.A., and the like).

The display unit 110 displays elements changed with transition between/among plural time points or plural versions in an aggregate graph structure in such a way as to be identifiable. For example, when the user selects one time point via the input unit 112, the display unit 110 displays an aggregate graph structure in such a way that changes in elements of plural graph structures corresponding to plural versions (target areas) at the time point will be identifiable.

Also, for example, when the user selects a version (target area) via the input unit 112, the display unit 110 displays an aggregate graph structure in such a way that changes in elements of plural graph structures corresponding to plural time points for the version will be identifiable. Consequently, the display unit 110 can display differences in the structure of the product among sales seasons as well as among sales areas and the like in the aggregate graph structure.

Figure 11:
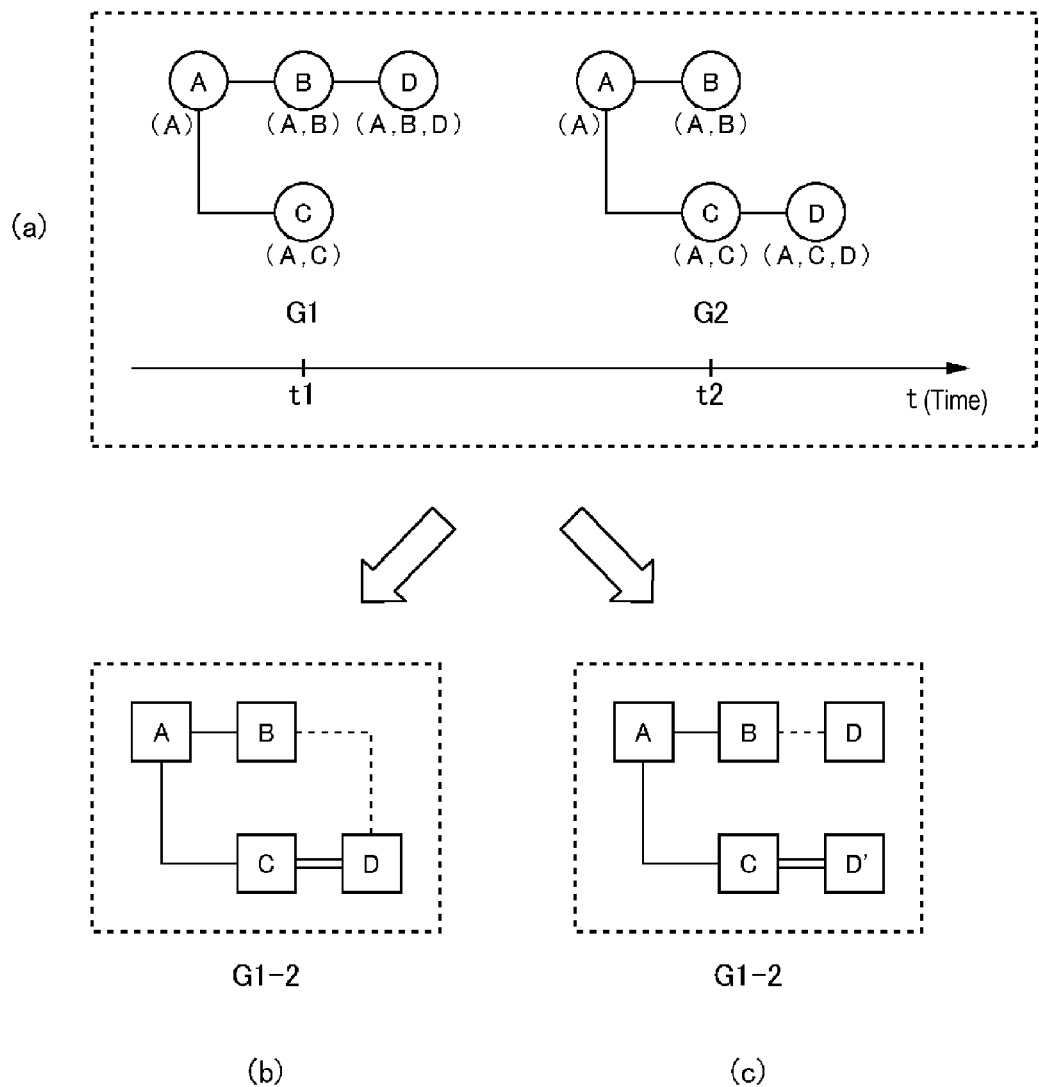
FIG. 11 shows an example of an aggregate graph structure according to a second modification of the present embodiment.

FIG. 11 shows an example of an aggregate graph structure according to a second modification of the present embodiment. In the present modification, when a path included in the display context of a node changes, the display unit 110 displays an aggregate graph structure by treating the node as one node or plural nodes.

In the present modification, the display apparatus 10 aggregates plural graph structures G1 and G2 shown in FIG. 11(a). As illustrated, graph structures G1 and G2 have a tree structure and the display apparatus 10 acquires a path from a root node A as display context of each node.

For example, the display unit 110 acquires a path from the root node A to node B to node D as the display context of node D of graph structure G1, and acquires a path from the root node A to node C to node D as the display context of node D of graph structure G2.

The display unit 110 may display nodes D of the same node ID as one node D in aggregate graph structure G1-2 regardless of the path of the display context as shown in FIG. 11(b).

Also, in aggregate graph structure G1-2, the display unit 110 may display nodes D differing in the path of display context as two nodes D and D' by distinguishing between them, as shown in FIG. 11(c).

The input unit 112 may accept a user command as to how to display an aggregate graph structure and the display unit 110 may display the aggregate graph structure according to the entered command. Consequently, the display apparatus 10 can allow the user to select a display policy for the aggregate graph structure.

Figure 12:
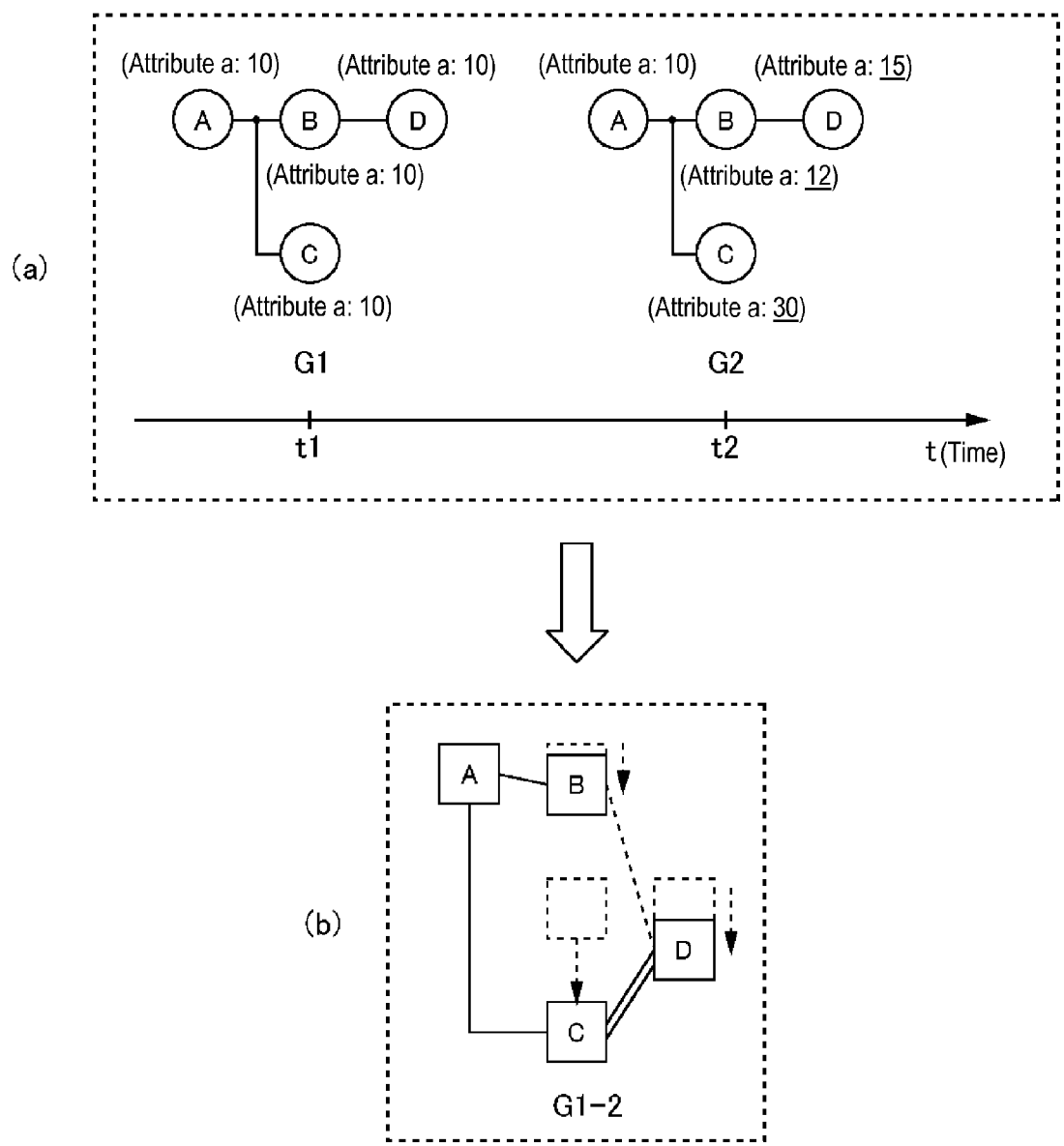
FIG. 12 shows an example of an aggregate graph structure according to a third modification of the present embodiment.

FIG. 12 shows an example of an aggregate graph structure according to a third modification of the present embodiment. In the present modification, the display unit 110 displays any node changed with transition between/among plural graph structures, by moving the position of the node in the aggregate graph structure.

For example, the display apparatus 10 acquires plural graph structures G1 and G2 shown in FIG. 12(a). As illustrated, during transition from graph structure G1 to graph structure G2, the attribute value of attribute a of node A remains unchanged, the attribute value of attribute a of node B changes from 10 to 12, the attribute value of attribute a of node C changes from 10 to 30, and the attribute value of attribute a of node D changes from 10 to 15.

In this case, in aggregate graph structure G1-2, the display unit 110 may display node B, node C, and node D by moving them so as to drop downward while displaying node A without moving it, as shown in FIG. 12(b).

Also, in the aggregate graph structure, the display unit 110 may display the position of any changed node by moving the position according to an amount of change in the node. For example, in aggregate graph structure G1-2, the display unit 110 may most greatly move node C whose rate of change in the attribute value of attribute a is the greatest while moving node B whose rate of change is the smallest by the smallest degree, as shown in FIG. 12(b). Consequently, the display unit 110 can visually display magnitudes of changes of elements in the aggregate graph structure.

Alternatively, the display unit 110 may display any changed node by vibrating the node or changing the color or size of the node according to the amount of change in the node. Also, the display unit 110 may display any changed node by moving the node according to a maximum value of the difference in a changed value between time points. Consequently, the display unit 110 can highlight any node whose attribute value has been changed suddenly.

Figure 13:
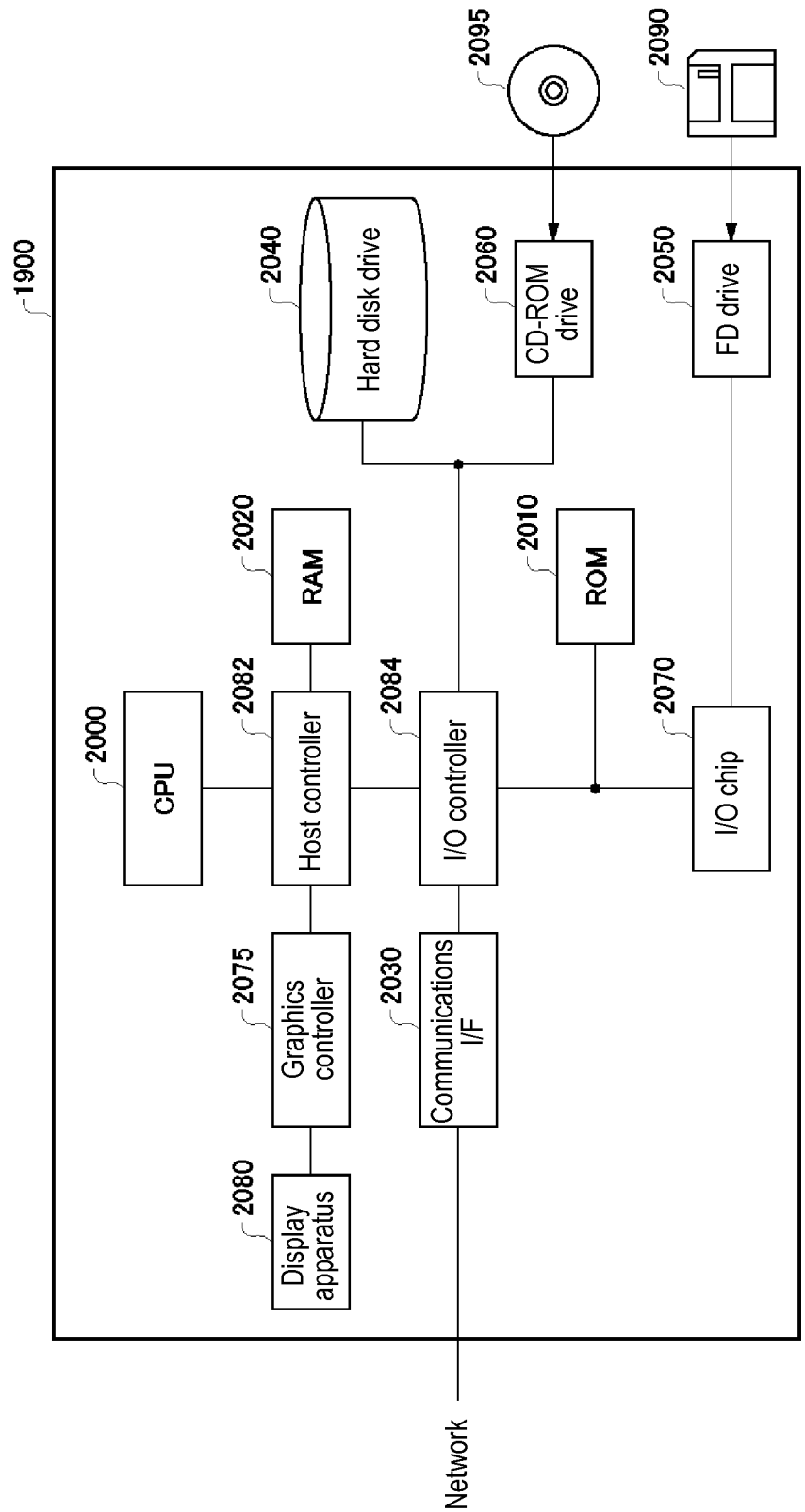
FIG. 13 shows an exemplary hardware configuration of a computer 1900.

FIG. 13 shows an exemplary hardware configuration of a computer 1900 functioning as the display apparatus 10. The computer 1900 according to the present embodiment includes CPU peripherals, an input/output unit, and a legacy input/output unit, where the CPU peripherals include a CPU 2000, a RAM 2020, a graphics controller 2075, and a display apparatus 2080 interconnected by a host controller 2082; the input/output unit includes a communications interface 2030, a hard disk drive 2040, and a CD-ROM drive 2060 connected to a host controller 2082 via an input/output controller 2084; and the legacy input/output unit includes a ROM 2010, a flexible disk drive 2050, and an input/output chip 2070 connected to the input/output controller 2084.

The host controller 2082 connects the RAM 2020 to the CPU 2000 and graphics controller 2075 which access the RAM 2020 at a high transfer rate. The CPU 2000 operates according to programs stored in the ROM 2010 and RAM 2020 and controls various parts.

The graphics controller 2075 acquires image data generated by the CPU 2000 and the like in a frame buffer provided in the RAM 2020 and displays the image data on the display apparatus 2080. Alternatively, the graphics controller 2075 may incorporate a frame buffer configured to store image data generated by the CPU 2000 and the like.

The input/output controller 2084 connects the host controller 2082 with the communications interface 2030, hard disk drive 2040, and CD-ROM drive 2060, which are relatively high-speed input/output devices. The communications interface 2030 communicates with other devices via a network by a wired or wireless method.

Also, the communications interface functions as hardware adapted to conduct communications for the display apparatus 10. The hard disk drive 2040 stores programs and data used by the CPU 2000 in the computer 1900. The CD-ROM drive 2060 reads a program or data from the CD-ROM 2095 and provides the program or data to the hard disk drive 2040 via the RAM 2020.

Also, the input/output controller 2084 is connected with the ROM 2010 as well as with the flexible disk drive 2050 and input/output chip 2070, which are relatively low-speed input/output devices. The ROM 2010 stores a boot program executed by the computer 1900 for startup and/or programs and the like dependent on the hardware of the computer 1900.

The flexible disk drive 2050 reads a program or data from the flexible disk 2090 and provides the program or data to the hard disk drive 2040 via the RAM 2020. The input/output chip 2070 connects the flexible disk drive 2050 to the input/output controller 2084 as well as connects various input/output devices to the input/output controller 2084, for example, through a parallel port, serial port, keyboard port, mouse port, or the like.

The program provided to the hard disk drive 2040 via the RAM 2020 is provided by the user by being stored on a recording medium such as the flexible disk 2090, the CD-ROM 2095, or an IC card. The program is read out of the recording medium, installed on the hard disk drive 2040 in the computer 1900 via the RAM 2020, and executed by the CPU 2000.

Programs installed on the computer 1900 and configured to make the computer 1900 function as the display apparatus 10 includes an acquisition module, a distinguishing module, an aggregating module, a contracting module, a display module, and an input module. The programs or modules may work upon the CPU 2000 or the like and make the computer 1900 function as the acquisition unit 102, distinguishing unit 104, aggregating unit 106, contracting unit 108, display unit 110, and input unit 112.

When read into the computer 1900, the information processing described in these programs functions as the acquisition unit 102, distinguishing unit 104, aggregating unit 106, contracting unit 108, display unit 110, and input unit 112, which are concrete means implemented by cooperation of software and the hardware resources described above. Then, by implementing computation and manipulation of information according to the intended use of the computer 1900 according to the present embodiment using the concrete means, a unique display apparatus 10 is constructed according to its intended use.

As an example, when the computer 1900 communicates with an external device and the like, the CPU 2000 executes a communications program loaded into the RAM 2020, and thereby instructs the communications interface 2030 to perform a communications process based on process details described in the communications program.

Under the control of the CPU 2000, the communications interface 2030 reads out transmit data stored in a transmit buffer area or the like provided on a storage device such as the RAM 2020, hard disk drive 2040, flexible disk 2090, or CD-ROM 2095 and transmits the data to the network or write receive data received from the network into a receive buffer area or the like provided on a storage device.

In this way, the communications interface 2030 may transfer the transmit/receive data to/from the storage device by DMA (direct memory access) method. Alternatively, the CPU 2000 may transfer the transmit/receive data by reading data from a transfer source, i.e., from the storage device or communications interface 2030, and writing the data into a transfer destination, i.e., into the communications interface 2030 or storage device.

Also, the CPU 2000 reads all or necessary part of files, a database, or the like stored in an external storage device such as the hard disk drive 2040, CD-ROM drive 2060 (CD-ROM 2095), or flexible disk drive 2050 (flexible disk 2090) into the RAM 2020 by DMA transfer or the like and performs various types of processing on the data in the RAM 2020.

Then, the CPU 2000 writes the processed data back into the external storage device, which may be the database 2, by DMA transfer or the like. In such processing, it can be considered that the RAM 2020 temporarily holds contents of the external storage device, and thus according to the present embodiment, the RAM 2020, external storage devices, and the like are collectively referred to as a memory, storage unit, storage device, or the like.

According to the present embodiment, various information on various programs, data, tables, databases, and the like are stored on such a storage device and are subject to information processing. Note that the CPU 2000 can hold part of the RAM 2020 in a cache memory and read and write from/into the cache memory. In such a form, the cache memory serves part of functionality of the RAM 2020, and thus it is assumed in the present embodiment that the cache memory is also included in the RAM 2020, memory, and/or storage device unless specifically differentiated.

Also, the CPU 2000 performs various types of processing on data read out of the RAM 2020, including various arithmetic operations, manipulation of information, conditional judgment, and information search and replacement specified by an instruction sequence of a program and described in the present embodiment, and writes the data back into the RAM 2020. For example, when performing the conditional judgment, the CPU 2000 compares various variables shown in the present embodiment with other corresponding variables or constants and determines whether a condition that the variables of the present embodiment are larger, smaller, equal or larger, equal or smaller, equal, or the like is satisfied, and branches to another instruction sequence or calls a subroutine when the condition is satisfied (or not satisfied).

Also, the CPU 2000 can search files, a database, or the like in a storage device for information. For example, it is conceivable that when plural entries are stored in a storage device with attribute values of a first attribute associated with respective attribute values of a second attribute, the CPU 2000 searches among plural entries stored in the storage device for an entry in which the attribute value of a first attribute meets a specified condition, reads the attribute value of the second attribute stored in the entry, and thereby obtain the attribute value of the second attribute associated with the attribute value of the first attribute which satisfies a predetermined condition.

The programs or modules described above may be stored on an external recording medium. In addition to the flexible disk 2090 and CD-ROM 2095, recording media available for use include optical recording media such as a DVD and CD, magneto-optical recording media such as an MO, tape media, and semiconductor memories such as an IC card. The programs may be provided to the computer 1900 via a network using a storage device, such as a hard disk or RAM provided on a server system connected to a private communications network or the Internet, as a recording medium.

As described herein, a first aspect of the present invention provides a display apparatus adapted to display a plurality of graph structures each of which is made up of a plurality of elements, by aggregating the plurality of graph structures into a single graph structure, comprising: an acquisition unit adapted to acquire a plurality of graph structures; a distinguishing unit adapted to distinguish the plurality of elements between unchanged elements which have not changed in the plurality of graph structures and changed elements which have changed with transition between/among the plurality of graph structures; an aggregating unit adapted to aggregate the plurality of graph structures; and a display unit adapted to display the aggregated graph structure such that the unchanged elements and the changed elements will be identifiable. Also, the first aspect of the present invention provides a display method of the display apparatus and a program used for the display apparatus.

Whereas the present invention has been described by referring to an embodiment, the technical scope of the present invention is not limited to the scope of the embodiment described above. It is apparent to those skilled in the art that various changes or improvements can be made to the embodiment described above. It will be apparent from the description of the appended claims that any form resulting from such changes or improvements is also included in the technical scope of the present invention.

Note that the execution sequence of the processes including the operation, procedures, steps, stages, and the like of the apparatus, system, program, and method described in the claims, specification, and drawings is not specified clearly using terms like "earlier than," "prior to," or the like in particular. Also, it should be noted that the processes can be implemented in any order unless the output of a preceding process is used in the succeeding process. Even if terms such as "First," "Next," and the like are used, for the sake of convenience, in relation to the operation flow described in the claims, specification, and drawings, this does not mean that it is essential to perform the operations in the described order.

Note that, in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A display apparatus adapted to display a plurality of graph structures by aggregating the plurality of graph structures into a single graph structure, wherein each of the graph structures is made up of a plurality of elements, and wherein the display apparatus comprises:
  an acquisition hardware unit adapted to acquire a plurality of graph structures, wherein the acquisition hardware unit acquires the plurality of graph structures at a plurality of time points in a time series;
  a distinguishing hardware unit adapted to distinguish the plurality of elements between unchanged elements that have not changed in the plurality of graph structures and changed elements that have changed with transition between/among the plurality of graph structures;
  an aggregating hardware unit adapted to aggregate the plurality of graph structures; and
  a display hardware unit adapted to display the aggregated graph structure such that the unchanged elements and the changed elements will be identifiable, wherein the display hardware unit displays a position of any node that has been changed with transition, between/among the plurality of graph structures, by moving the position in the aggregated graph structure.

2. The display apparatus according to claim 1, wherein the acquisition hardware unit acquires a graph structure that contains nodes and edges as individual elements from the plurality of elements.

3. The display apparatus according to claim 2, further comprising:
  a contracting hardware unit adapted to contract two or more of the elements in the aggregated graph structure into a single contracted element, wherein when displaying the aggregated graph structure, the display hardware unit displays the single contracted element instead of the two or more elements.

4. The display apparatus according to claim 3, wherein:
  the contracting hardware unit contracts two or more unchanged elements; and
  in response to displaying the aggregated graph structure, the display hardware unit displays the single contracted element instead of the two or more unchanged elements.

5. The display apparatus according to claim 3, further comprising:
  an input hardware unit adapted to accept an input from a user, wherein, in response to the user entering a command to expand the single contracted element via the input hardware unit, the display hardware unit displays the two or more elements existing before contraction into the single contracted element, instead of the single contracted element.

6. The display apparatus according to claim 2, wherein the display hardware unit displays a time series that represents the plurality of time points, and wherein in response to a time point in the time series being selected, the display hardware unit displays a graph structure that corresponds to the selected time point.

7. The display apparatus according to claim 6, wherein in the graph structure corresponding to the selected time point, the display hardware unit displays the nodes at same positions as in the aggregated graph structure.

8. The display apparatus according to claim 6, wherein:
  when two or more time points in the time series are selected, the aggregating hardware unit generates a graph structure by aggregating two or more graph structures corresponding to the selected two or more time points; and
  the display hardware unit displays the graph structure generated by aggregating the two or more graph structures corresponding to the selected two or more time points.

9. The display apparatus according to claim 5, wherein:
  each of the elements has an attribute name and an attribute value corresponding to the attribute name; and
  in response to an attribute name being specified by the user, the distinguishing hardware unit distinguishes the plurality of elements between unchanged elements whose attribute values corresponding to the specified attribute name remain unchanged and changed elements whose attribute values corresponding to the specified attribute name have been changed.

10. The display apparatus according to claim 5, wherein in response to a node being selected, the display hardware unit displays graph structures existing at time points before and after the selected node changes.

11. The display apparatus according to claim 6, wherein the distinguishing hardware unit calculates a quantity of elements changed with transition between graph structures corresponding to two adjacent time points in the time series; and
  the display hardware unit displays a quantity of the changed elements between the two adjacent time points in the time series.

12. The display apparatus according to claim 11, wherein in the aggregated graph structure, the display hardware unit displays the position of the changed node by moving the position according to an amount of change in the node.

13. The display apparatus according to claim 1, wherein the display hardware unit displays the aggregated graph structure such that the changed elements, once deleted at plural time points and then generated again, are identifiable.

14. A computer program product for making a computer function as a display apparatus adapted to display a plurality of graph structures, each of which is made up of a plurality of elements, by aggregating the plurality of graph structures into a single graph structure, wherein the program product comprises a computer readable storage medium having program code embodied therewith, the program code readable and executable by a processor to perform a method comprising:
  acquiring a plurality of graph structures;
  distinguishing the plurality of elements between unchanged elements that have not changed in the plurality of graph structures and changed elements that have changed with transition between/among the plurality of graph structures;
  aggregating the plurality of graph structures;
  displaying the aggregated graph structure such that the unchanged elements and the changed elements will be identifiable;
  acquiring a graph structure that contains nodes and edges as individual elements of the plurality of elements;
  acquiring the plurality of graph structures at a plurality of time points in a time series; and contracting two or more elements in the aggregated graph structure into a single contracted element, wherein the aggregated graph structure is displayed as the single contracted element instead of the two or more elements.

15. A display apparatus adapted to display a plurality of graph structures by aggregating the plurality of graph structures into a single graph structure, wherein each of the graph structures is made up of a plurality of elements, and wherein the display apparatus comprises:
- an acquisition hardware unit adapted to acquire a plurality of graph structures;
- a distinguishing hardware unit adapted to distinguish the plurality of elements between unchanged elements that have not changed in the plurality of graph structures and changed elements that have changed with transition between/among the plurality of graph structures;
- an aggregating hardware unit adapted to aggregate the plurality of graph structures; and
- a display hardware unit adapted to display the aggregated graph structure such that the unchanged elements and the changed elements will be identifiable, wherein the display hardware unit displays the aggregated graph structure such that the changed elements, once deleted at plural time points and then generated again, are identifiable.

* * * * *